United States Patent
Tyagi et al.

(10) Patent No.: US 7,636,302 B2
(45) Date of Patent: Dec. 22, 2009

(54) AVOIDING UNNECESSARY RSVP-BASED PREEMPTIONS

(75) Inventors: Satyam Tyagi, Richardson, TX (US); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 11/134,668

(22) Filed: May 20, 2005

(65) Prior Publication Data

US 2006/0274650 A1    Dec. 7, 2006

(51) Int. Cl.
  *G01R 31/08* (2006.01)
  *H04L 12/28* (2006.01)
  *H04J 3/02* (2006.01)
  *H04J 3/16* (2006.01)

(52) U.S. Cl. .................... 370/229; 370/395.2; 370/462; 370/468

(58) Field of Classification Search ................. 370/229, 370/230, 230.1, 392.2, 395.21, 468, 477, 370/395.2, 462, 395.5
See application file for complete search history.

(56) References Cited

U.S. PATENT DOCUMENTS

| | | | |
|---|---|---|---|
| 5,473,599 A | 12/1995 | Li et al. | |
| 6,195,705 B1 | 2/2001 | Leung | |
| 6,400,681 B1 | 6/2002 | Bertin et al. | |
| 6,493,317 B1 | 12/2002 | Ma | |
| 6,643,260 B1 | 11/2003 | Kloth et al. | |
| 6,728,365 B1 * | 4/2004 | Li et al. | 379/329 |
| 6,788,647 B1 | 9/2004 | Mohaban et al. | |
| 6,798,746 B1 | 9/2004 | Kloth et al. | |
| 6,847,827 B2 * | 1/2005 | Helm et al. | 455/509 |
| 6,868,065 B1 | 3/2005 | Kloth et al. | |
| 6,870,812 B1 | 3/2005 | Kloth et al. | |
| 6,876,668 B1 | 4/2005 | Chawla et al. | |
| 6,973,035 B2 * | 12/2005 | Seddigh et al. | 370/235 |
| 6,999,436 B2 * | 2/2006 | Zheng et al. | 370/331 |

(Continued)

OTHER PUBLICATIONS

U.S. Appl. No. 10/875,985, filed Jun. 24, 2004, Dhesikan et al.

(Continued)

*Primary Examiner*—Kwang B Yao
*Assistant Examiner*—Candal Elpenord
(74) *Attorney, Agent, or Firm*—Cesari and McKenna LLP

(57) ABSTRACT

A technique avoids unnecessary preemption of resource reservations along a requested flow between nodes in a computer network. A node receives priority-based resource reservation requests and determines conditions of reservation eligibility by comparing the requested resources to the amount of available resources at the node. Specifically, the node maintains a "held resources" state where available requested resources are held prior to their being assigned or reserved (confirmed) for the requested flow, such as, e.g., during an initial Resource reSerVation Protocol (RSVP) Path message. The node includes the held resources in calculations of available resources in such a way as to prevent resources from being assigned or reserved if the resources would be subsequently preempted by a request of higher priority, or if an earlier request would first utilize the resources. The node (e.g., an end node) also prevents resources from being reserved or preempted in a duplex (bi-directional) reservation on a first flow in a first direction when resources available for a second flow in a second direction indicate a failure of the second flow.

26 Claims, 12 Drawing Sheets

U.S. PATENT DOCUMENTS

| | | | |
|---|---|---|---|
| 7,013,338 B1 * | 3/2006 | Nag et al. | 709/226 |
| 7,069,337 B2 * | 6/2006 | Rawlins et al. | 709/238 |
| 7,076,540 B2 * | 7/2006 | Kurose et al. | 709/223 |
| 7,106,756 B1 * | 9/2006 | Donovan et al. | 370/468 |
| 2003/0005130 A1 * | 1/2003 | Cheng | 709/228 |
| 2003/0097460 A1 * | 5/2003 | Higashiyama et al. | 709/232 |
| 2003/0161322 A1 * | 8/2003 | Shaheen et al. | 370/395.21 |
| 2003/0223431 A1 * | 12/2003 | Chavez et al. | 370/395.42 |
| 2006/0056291 A1 * | 3/2006 | Baker et al. | 370/229 |

OTHER PUBLICATIONS

Perlman, Radia, Interconnections Second Edition: Bridges, Routers, Switches, and Internetworking Protocols, Addison Wesley, 1999, Section 1.1—Layers, pp. 1-7.

Herzog, S., RFC 2750 entitled, RSVP Extensions for Policy Control, Jan. 2000, pp. 1-13.

Herzog, S., RFC 3181 entitled, Signaled Preemption Priority Policy Element, Oct. 2001, pp. 1-12.

Braden, R. et al., RFC 2205, entitled Resource ReSerVation Protocol (RSVP), Version 1 Functional Specification, Sep. 1997, pp. 1-112.

* cited by examiner

PATH_HELD_RESOURCES TABLE 800

| REQUEST ID 805 | REQUESTED RESOURCES 810 | PRIORITY 815 |
|---|---|---|
| 820a | 20 M | 4 |
| 820b | 10 M | 1 |
| 820c | 20 M | 2 |
| ... | ... | ... |

FIG. 8A

RESERVED RESOURCES TABLE 850

| RESERVATION ID 855 | RESERVED RESOURCES 860 | PRIORITY 865 |
|---|---|---|
| 870a | 20 M | 2 |
| 870b | 20 M | 3 |
| 870c | 10 M | 5 |
| ... | ... | ... |

FIG. 8B

SINGLE PATH REQUEST

WITHOUT HELD RESOURCES:

| | | |
|---|---|---|
| A1 - | PATH 1 → | :RESOURCE AVAILABLE |
| B1 - | ← RESV 1 | :ASSIGN RESOURCE |
| C1 - | RESVCONF 1 → | :COMPLETE RESERVATION |

WITH HELD RESOURCES:

| | | |
|---|---|---|
| A1 - | PATH 1 → | :RESOURCE AVAILABLE, HOLD |
| B1 - | ← RESV 1 | :HELD RESOURCE, ASSIGN RESOURCE |
| C1 - | RESVCONF 1 → | :COMPLETE RESERVATION |

PRIORITY: PATH 1 = LOW; PATH 2 = HIGH

WITHOUT HELD RESOURCES:

| | | |
|---|---|---|
| A1 - | PATH 1 → | :RESOURCE AVAILABLE |
| A2 - | PATH 2 → | :RESOURCE AVAILABLE |
| B1 - | ← RESV 1 | :ASSIGN RESOURCE |
| B2 - | ← RESV 2 | :ASSIGN RESOURCE, MARK 1 TO PREEMPT |
| C1 - | RESVCONF 1 → | :COMPLETE RESERVATION |
| C2 - | RESVCONF 2 → | :COMPLETE RESERVATION, PREEMPT 1 |

WITH HELD RESOURCES:

| | | |
|---|---|---|
| A1 - | PATH 1 → | :RESOURCE AVAILABLE, HOLD |
| A2 - | PATH 2 → | :RESOURCE AVAILABLE, REMOVE 1, HOLD |
| B1 - | ← RESV 1 | :NOT HELD RESOURCE, NOT ASSIGNED |
| B2 - | ← RESV 2 | :HELD RESOURCE, ASSIGNED |
| C1 - | — → | :N/A |
| C2 - | RESVCONF 2 → | :COMPLETE RESERVATION, NO PREEMPTION |

PRIORITY: PATH 1 = HIGH; PATH 2 = LOW

WITHOUT HELD RESOURCES:

| | | |
|---|---|---|
| A1 - | PATH 1 → | :RESOURCE AVAILABLE |
| A2 - | PATH 2 → | :RESOURCE AVAILABLE |
| B1 - | ← RESV 1 | :ASSIGN RESOURCE |
| B2 - | ← RESV 2 | :NO AVAILABLE RESOURCE, PATH FAILS |
| C1 - | RESVCONF 1 → | :COMPLETE RESERVATION |
| C2 - | — | :RESERVATION NOT CONFIRMED |

WITH HELD RESOURCES:

| | | |
|---|---|---|
| A1 - | PATH 1 → | :RESOURCE AVAILABLE, HOLD |
| A2 - | PATH 2 → | :RESOURCE NOT AVAILABLE, NOT HELD, FAILS |
| B1 - | ← RESV 1 | :HELD RESOURCE, ASSIGNED |
| B2 - | — | :N/A |
| C1 - | RESVCONF 1 → | :COMPLETE RESERVATION |
| C2 - | — | :N/A |

FIG. 11

AVOIDING UNNECESSARY RSVP-BASED PREEMPTIONS

BACKGROUND OF THE INVENTION

1. Field of the Invention

The present invention relates to network communications and, more specifically, to allocating resources for use in network communications.

2. Background Information

A computer network is a geographically distributed collection of interconnected subnetworks for transporting data between network nodes, such as computers. A local area network (LAN) is an example of such a subnetwork. The network's topology is defined by an arrangement of client nodes that communicate with one another, typically through one or more intermediate network nodes, such as routers or switches. As used herein, a client node is a network node that is configured to originate or terminate communications over the network. In contrast, an intermediate network node is a node that facilitates routing data between client nodes. Communications between network nodes are typically effected by exchanging discrete packets of data according to predefined protocols. In this context, a protocol consists of a set of rules defining how the nodes interact with each other.

The data packets transferred among the network nodes may include fixed-sized data cells and/or variable-sized data frames. Each data packet typically comprises "payload" data prepended ("encapsulated") by at least one network header formatted in accordance with a network communication protocol. The network headers include information that enables the client nodes and intermediate nodes to route the packet efficiently through the computer network. Often, a packet's network headers include at least a data-link (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published Sep. 1999, which is hereby incorporated by reference as though fully set forth herein.

In operation, a client node may send a data packet to a network interface of an intermediate network node. Thereafter, the intermediate network node receives the packet and forwards the packet to its next destination. For example, the intermediate network node may perform a layer-2 switching function that simply re-directs the packet from one network interface to another based on the contents of the packet's data-link header. Alternatively, the intermediate network node may perform a layer-3 routing function, or forwarding decision, that selects the most appropriate network interface to forward the packet based on the contents of the packet's internetwork header.

Data packets are used to transport many forms of information, including voice and video information, over networks and subnetworks. For instance, voice information may be transmitted in accordance with the Voice over Internet Protocol (VoIP). VoIP refers to a group of technologies used to transmit voice information over data networks from a source node to a destination node. The source and destination nodes employ voice agents that convert voice information from its traditional telephony form to a form that is suitable for packet transmission. In other words, the source node's voice agent encodes, compresses, and encapsulates the voice information into a plurality of data packets, and the destination node's voice agent performs complementary functions to de-encapsulate, uncompress, and decode the VoIP packets. Examples of voice agents include IP telephones, VoIP gateways, certain private branch exchanges (PBXs), personal computers (PCs) running communication applications, network devices providing voice gateway services, etc.

A source node (sender) may be configured to transfer a unidirectional stream of data packets, or a "data flow," to a destination node (receiver) in a data network. The data flow may comprise, for example, data or voice information. The data flow is unidirectional in that data travels one-way from the sender to the receiver. The logical procession of network nodes that transmit and receive data packets from the sender to the receiver defines the data flow's data path. A first node that is nearer the receiver in the data flow's data path than a second node in the flow is said to be "downstream" from the second node. Likewise, a first node that is nearer the sender in the data flow's path than a second node in the flow is said to be "upstream" from the second node. As used herein, a "flow" and a "path" may be used interchangeably herein, as will be understood by those skilled in the art. Notably, some applications, such as certain voice communications, require data flows in two opposing directions (bi-directional). In other words, a first data flow may transport one caller's voice from node A to node B, and a second (opposing) data flow may carry the voice data of the other participant from node B to node A. In this case, loss of either of the data flows may render the telephone call useless. Such bi-directional data flows are often referred to as a "duplex."

Some data flows are associated with a certain level of quality of service (QoS). For example, a data flow's QoS may specify minimum end-to-end latency or bandwidth requirements needed to support the flow. The Resource reSerVation Protocol (RSVP) is a network-control protocol that enables source and destination nodes to "reserve" the necessary resources to establish the data flow in accordance with the flow's required QoS. RSVP works in conjunction with routing protocols to, e.g., reserve resources along a data flow between the source and destination nodes to establish a level of QoS required by the data flow. RSVP is defined in R. Braden, et al., "Resource ReSerVation Protocol (RSVP)," Request For Comments (RFC) 2205, which is hereby incorporated by reference as though fully set forth herein.

In a typical arrangement, the sender sends an RSVP Path message identifying itself and indicating the minimum bandwidth needed to receive the data flow. The Path message proceeds to the receiver through the data flow, and each intermediate network node may update an optional "Adspec" object of the Path message. The Adspec object contains, inter alia, information about the properties of the data flow, such as available services, delay, and bandwidth estimates. Adspec objects may be generated by senders or by intermediate nodes, and are modified as they travel from one node to another. An Adspec object advertises the possible service parameters composed of the properties of all previous-hop nodes upstream. Namely, the arriving Adspec object is combined with the node's own parameters and service conditions, and then forwarded to the next node. A receiver can use the Adspec information to predict the end-to-end QoS, to choose the most appropriate service and to scale its QoS request according to the current possibilities of the network. If any node along the flow is unable to meet the minimum QoS value (e.g., bandwidth), the node may send a Path Error (PathErr) message to the sender, or may continue to forward with Path message with an Adspec object indicating the potential failure conditions.

The receiver receives the Path message and may first determine whether the data flow can support the requested resources based on the contents of the optional Adspec object in the Path message. If the flow can be supported, (or if no Adspec object is found in the Path message) the receiver responds with a "request for resources" in the form of an RSVP reservation request (Resv message) which travels hop-by-hop back to the sender. Within the Resv message is a "FlowSpec" object, which contains, inter alia, an indication of a peak expected traffic value (e.g., bandwidth) from the sender (Tspec), and the requested traffic value to be reserved (Rspec). At each hop, the corresponding intermediate network node sets aside ("assigns") sufficient resources to provide the requested bandwidth for the desired data flow. These assigned resources are consequently made available to the data flow so that the data packets of the flow get appropriate QoS treatment.

If sufficient resources are not available, an intermediate network node may "reject" the Resv message (i.e., does not continue forwarding it), generate a reserve error (ResvErr) message, and forward the ResvErr message downstream over the flow to the destination node. The destination node eventually receives the ResvErr message and concludes that the reservation has failed. A destination node whose Resv message has been rejected may later re-attempt to acquire the resources by re-transmitting another Resv message. Source nodes are unaffected by this process, and they continue to send Path messages to refresh their state.

As defined in RFC 2205, an RSVP data flow is "admitted" and resources allocated to the data flow using a capacity-based admission control technique. According to this technique, resources are allocated to data flows on a "first-come-first-admitted" basis until the capacity of the resources is exhausted. S. Herzog, "RSVP Extensions for Policy Control," RFC 2750, which is hereby incorporated by reference as though fully set forth herein, defines an extension to RFC 2205 that incorporates policy-based admission control. Through this extension to RSVP, admission control involves reserving resources on a policy basis in addition to using capacity as a basis. A simple example of such is an authentication/authorization policy. If a person attempts to reserve bandwidth but is unknown to the administration or makes an unauthorized request, the request will be denied based on the authentication/authorization policy even though bandwidth is available. But among authorized requestors, bandwidth is granted on a first-come-first-admitted basis.

A policy often employed in conjunction with RFC 2750 is a preemption-priority-based policy described in S. Herzog, "Signaled Preemption Priority Policy Element," RFC 3181, which is hereby incorporated by reference as though fully set forth herein. The preemption-priority-based policy incorporates a technique that allows a new reservation to preempt one or more existing lower priority reservations in order to acquire resources reserved for the lower priority reservations. According to the technique, a preemption-priority value is associated with a new reservation and defending-priority values are associated with respective existing reservations. The reservations' preemption and defending priority values may be assigned in various ways known in the art. The preemption-priority value for the new reservation is compared with the defending-priority values of existing reservations to determine if the new reservation "preempts" any existing lower priority reservations. If so, resources allocated to selected lower priority reservations are reallocated for the new reservation.

In practice, a Resv message either contains the preemption-priority value associated with the new reservation or a default preemption-priority value is assigned to the reservation request if it does not already contain one. A network node that receives the Resv message may first determine if sufficient unallocated resources are immediately available to satisfy the resources requested in the Resv message. If not, the node then may identify lower priority existing reservations that may be preempted to meet the needs of the new reservation. This may be done by comparing the new reservation's preemption priority value with the defending priority value of an existing reservation to determine if the new reservation is higher in priority than the existing reservation. If so, the network node may preempt the existing reservation by "tearing it down" and reallocating the resources associated with the torn down reservation to the new reservation. Thereafter, a ResvErr message is sent downstream along the data flow to notify the downstream nodes, including the destination node, of the preemption.

One problem with the above-described preemption technique is that it may cause lower priority reservations to be unnecessarily preempted, thus, causing unnecessary disruption to data flows associated with these reservations. For example, if a new reservation fails due to, e.g., an upstream node not having sufficient resources for the new reservation, downstream nodes that have already preempted lower priority reservations to allocate resources to the new reservation have unnecessarily disrupted the data flows associated with the preempted reservations. In addition, to "reclaim" the resources lost due to preemption, the lower priority reservations would have to be re-established, thus causing the data flows to incur further disruption.

A method to solve this problem is described in commonly-owned copending U.S. patent application Ser. No. 10/875,985, entitled METHOD FOR IMPROVING RSVP-BASED PREEMPTION, filed by Dhesikan et al., on Jun. 24, 2004, the contents of which are hereby incorporated by reference in its entirety. The method described therein first marks lower priority reservations for preemption, and waits until it is determined that all nodes along the flow are able to comply with the Path request, and that the flow should not otherwise fail. Once the sender receives notice (e.g., in a Resv message) that all intermediate nodes can comply (i.e., with available or pre-emptable resources), the sender transmits a Reservation Confirmation (ResvConf) message downstream to the receiver. When each intermediate node receives the ResvConf message, it then preempts any necessary reservations that were previously marked.

Another problem associated with the above-described preemption technique is that it may cause unnecessary preemptions in the event a lower-priority reservation is granted and is substantially immediately preempted by another reservation with a higher priority. This situation forces the lower-priority reservation to tear down the connection, and attempt to create a new flow, causing extra signaling and potentially non-user friendly results. Also, the lower priority reservations may have had alternative options available, such as, e.g., alternative routes in the network, or other known network protocols. In addition, the above-described preemption technique unnecessarily preempts reservations during certain duplex reservations, such as where a first flow in a first direction preempts reservations only to have a second flow in a second direction fail. As noted above, a failure of one of the two bi-directional flows in a duplex renders the duplex essentially useless; hence the preemptions for the first flow were unnecessary.

SUMMARY OF THE INVENTION

The present invention is directed to a technique for avoiding unnecessary preemption of resource reservations along a requested flow between nodes in a computer network.

According to the technique, a node receives priority-based resource reservation requests and determines conditions of reservation eligibility by comparing the requested resources to the amount of available resources at the node. Specifically, the node maintains a novel "held resources" state where available requested resources are held prior to their being assigned or reserved (confirmed) for the requested flow, such as, e.g., during an initial Resource reSerVation Protocol (RSVP) Path message. The node includes the held resources in calculations of available resources in such a way as to prevent resources from being assigned or reserved if the resources would be subsequently preempted by a request of higher priority, or if an earlier request would first utilize the resources. The node (e.g., an end node) also prevents resources from being reserved or preempted in a duplex (bi-directional) reservation on a first flow in a first direction when resources available for a second flow in a second direction indicate a failure of the second flow.

In accordance with one aspect of the present invention, when a node receives a Path message requesting a reserved flow, the node determines if there are available resources that meet the criteria of the requested flow. Available resources of the node include idle resources (unreserved/held) in combination with any lower priority reserved resources that may be preempted, less previously held resources at the node of equal or higher priority. In the event that insufficient resources exist at the node, the requested flow fails and the node may transmit an indication of the failure. Where there are available resources the node holds the resources for the requested flow. The node then adjusts any currently held resources by removing the lowest priority held resource until the idle resources, in addition to reserved resources with a priority lower than the lowest priority held resource, are greater than or equal to the total held resources.

In accordance with another aspect of the present invention, when a node receives a Resv message requesting that resources be assigned for a reserved flow, the node establishes whether the resources contained in the Resv message correspond to any previously held resources. If so, the node assigns (reserves) the resources to the requested flow. If not, however, the node again determines if there are available resources that meet the criteria of the requested flow. In the event that insufficient resources exist, the requested flow fails and the node may transmit an indication of the failure. Where there are available resources, the node assigns the resources to the requested flow and again adjusts any currently held resources. Notably, no preemptions are performed until the node receives a ResvConf message, confirming the reservation of the requested flow.

In accordance with still another aspect of the present invention, when operating to create a duplex reservation between two end nodes, a first end node confirms reservations for a first flow in a first direction dependent upon receiving an indication that a second flow in a second direction is likely to be successful. In particular, upon receiving a first Resv message for the first flow from a second end node, the first end node determines whether is has received a second Path message for the second flow. If the second Path message indicates that sufficient resources may be reserved for the second flow (e.g., in an Adspec object), the first end node then confirms the reservation of the first flow (e.g., with a ResvConf message). Otherwise, if the second flow is not likely to succeed (e.g., no receipt of the second Path message or other indication of failure in the second Path message), the first end node denies confirmation of the first flow anticipating the failure of duplex reservation. In this way, any unnecessary preemptions required by the confirmation of the first flow are avoided in the event the second flow of the duplex nonetheless fails.

Advantageously, the novel technique avoids unnecessary preemption of resource reservations along a requested flow between nodes in a computer network. By holding priority-based requested resources and using the held resources when calculating the available resources of the node prior to assigning and/or reserving the resources, the inventive technique prevents resources from being unnecessarily assigned or reserved, and hence prevents unnecessary preemptions that would occur from such assignments or reservations. Also, by preventing resources from being reserved in a duplex reservation on a first flow when a second flow indicates failure, unnecessary preemptions that could occur from reserving the first flow are avoided.

BRIEF DESCRIPTION OF THE DRAWINGS

The above and further advantages of the invention may be better understood by referring to the following description in conjunction with the accompanying drawings in which like reference numbers indicate identical or functionally similar elements, of which:

FIG. 8A is a schematic block diagram of portions of an exemplary held resources table that may be advantageously used with the present invention;

FIG. 8B is a schematic block diagram of portions of an exemplary reserved resources table that may be advantageously used with the present invention;

FIG. 11 is a schematic diagram of representative signaling exchanges to reserve resources for one or more flows at a node in accordance with the present invention.

DETAILED DESCRIPTION OF AN ILLUSTRATIVE EMBODIMENT

Figure 1:
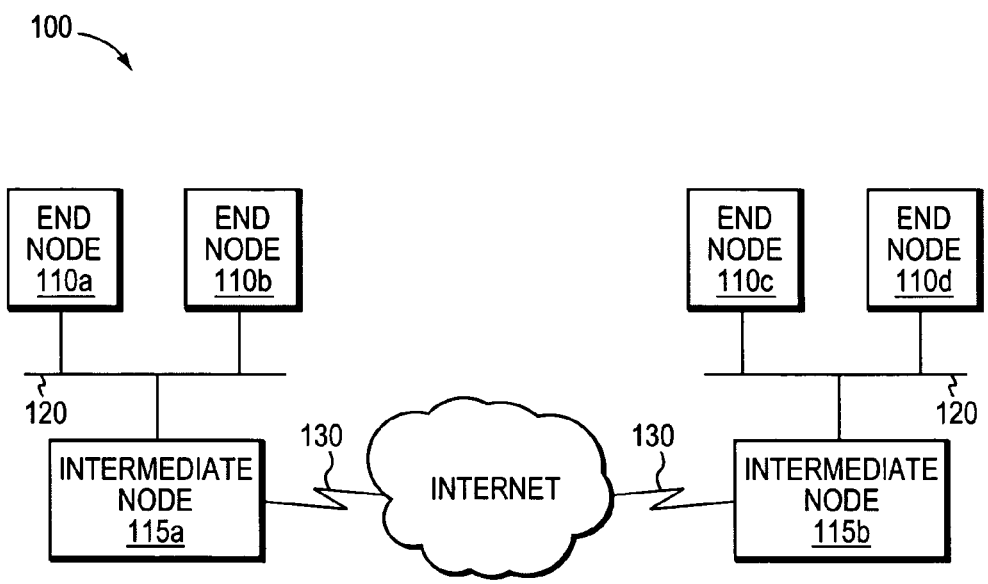
FIG. 1 is a schematic block diagram of an exemplary computer network that may be advantageously used with the present invention.

FIG. 1 is a schematic block diagram of an exemplary computer network 100 that may be advantageously used with the present invention. The network 100 comprises a plurality of interconnected network nodes, such as end nodes 110 and intermediate nodes 115. The nodes may be interconnected over local area network (LAN) links 120, point-to-point links, wide area network (WAN) links 130, wireless LANs, etc., to form the network 100. The interconnected network nodes may exchange data packets according to predefined sets of network communication protocols, such as the Transmission Control Protocol/Internet Protocol (TCP/IP) and the Resource Reservation Protocol (RSVP).

Figure 2:
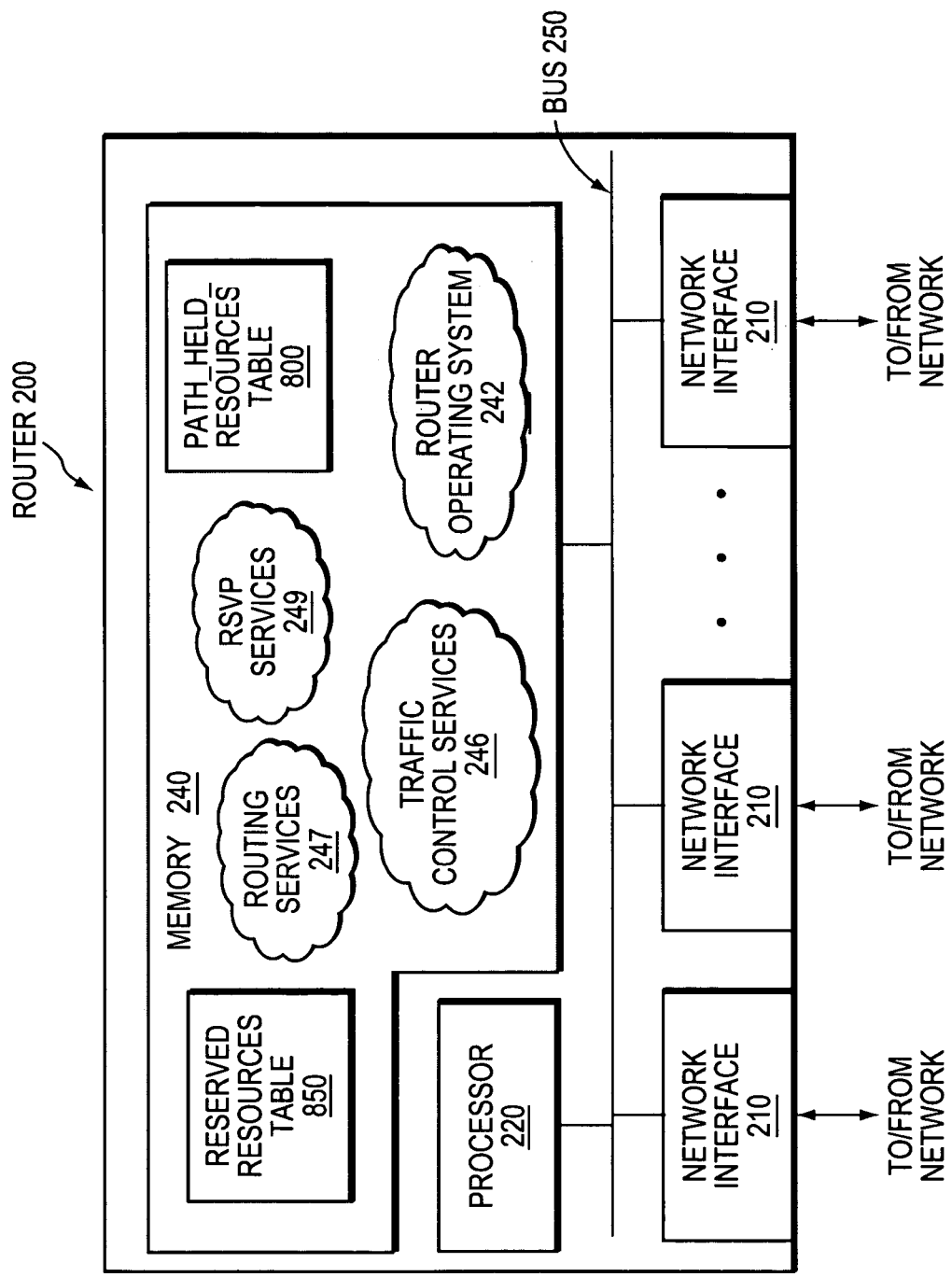
FIG. 2 is a schematic block diagram of an exemplary node that may be advantageously used with the present invention.

FIG. 2 is a schematic block diagram of an exemplary node 200, which is illustratively a router that may be advantageously used with the present invention as an end node or an intermediate node. The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as a path_held_resources ("held resources") table 800 and a reserved resources table 850, both described further herein. A router operating system 242, portions of which is typically resident in memory 240 and executed by the processor, functionally organizes the router by, inter alia, invoking network operations in support of software processes and/or services executing on the router. These software processes and/or services include traffic control services 246, routing services 247 and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in Request for Comments (RFC) 2205, entitled *Resource ReSerVation Protocol (RSVP)*, RFC 2750, entitled *RSVP Extensions for Policy Control*, and in RFC 3181, entitled *Signaled Preemption Priority Policy Element*, all as incorporated above.

In accordance with RSVP, to establish a data flow between a sender (e.g., end node 110a) and a receiver (e.g., end node 110d), the sender may send an RSVP path (Path) message downstream to the receiver along a flow (e.g., a unicast route) to identify the sender and indicate e.g., bandwidth needed to accommodate the data flow, along with other attributes of the data flow. The Path message may contain various information about the data flow including, e.g., traffic characteristics of the data flow.

Figure 3:
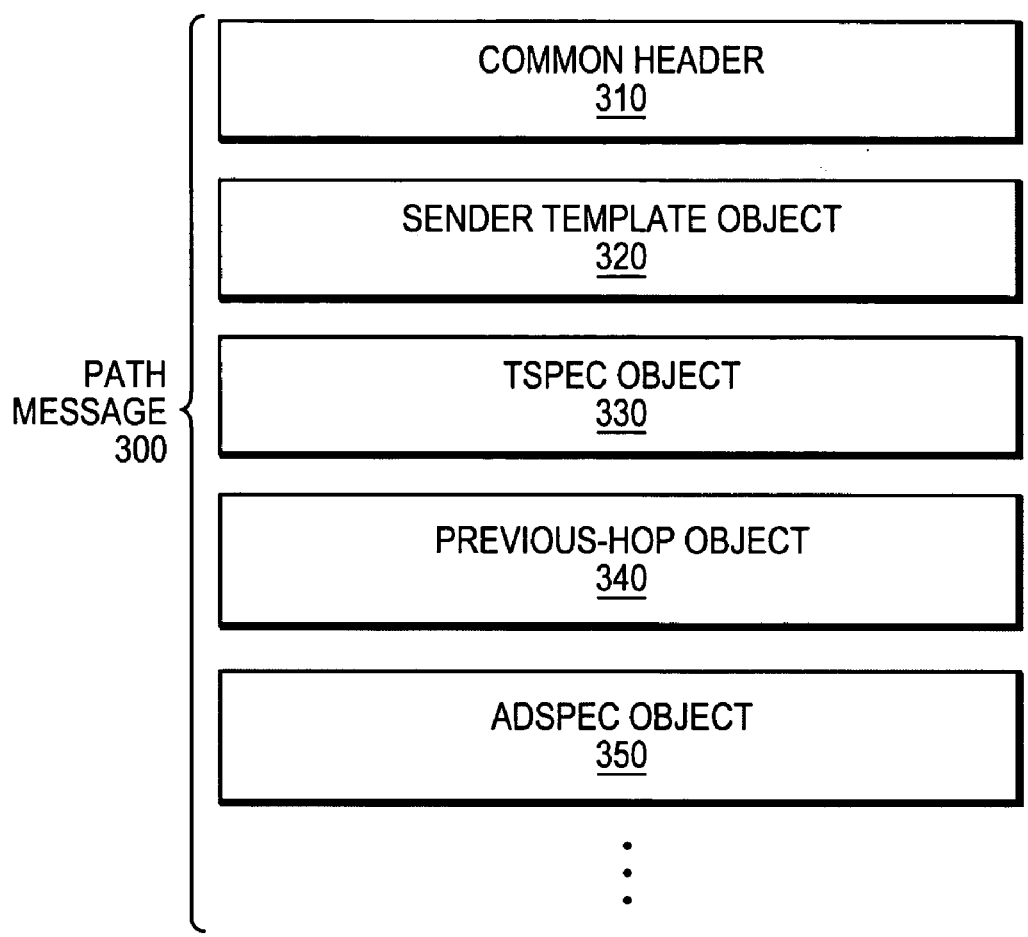
FIG. 3 is a schematic block diagram of portions of a path request message that may be advantageously used with the present invention.

FIG. 3 is a schematic block diagram of portions of a path request (e.g., RSVP Path) message 300 that may be advantageously used with the present invention. Message 300 contains, inter alia, a common header 310, a sender template object 320, a traffic specification (Tspec) object 330, a previous-hop object 340, and an advertised flow specification (Adspec) object 350. The sender template object 320 holds information about the sender, such as an address and port associated with the sender, while Tspec object 330 holds information that, e.g., defines various traffic characteristics of a data flow between the sender and a receiver. Previous-hop object 340 holds information relating to a previous hop (node) in the flow between the sender and receiver. As noted above, the Adspec object 350 contains, inter alia, information about the properties of the data flow, such as available services, delay, and bandwidth estimates. Adspec objects may be generated by senders or by intermediate nodes, and are modified as they travel from one node to another, advertising the possible service parameters composed of the properties of all previous-hop nodes upstream.

In accordance with the RSVP, a receiver establishes a new reservation for a data flow between the sender and receiver by responding to a sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver.

Figure 4:
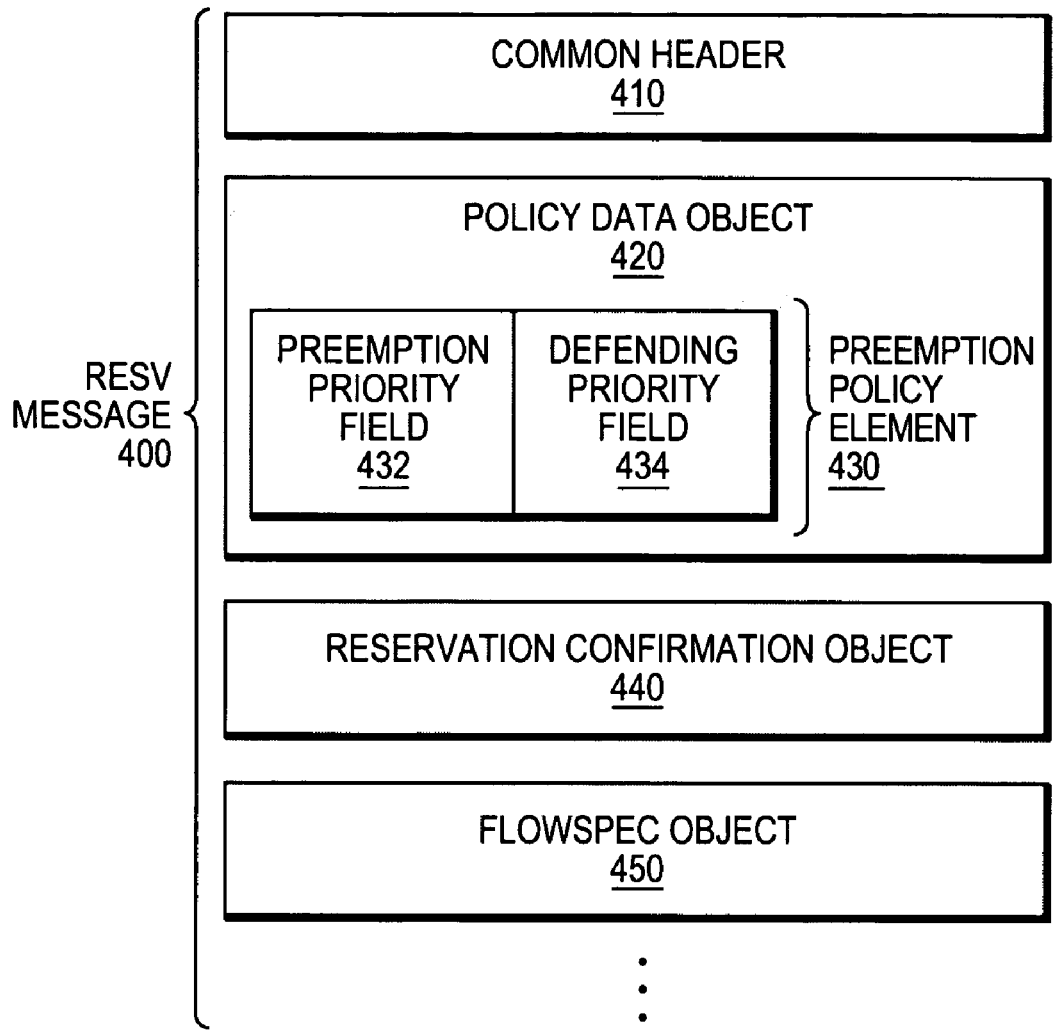
FIG. 4 is a schematic block diagram of portions of a reservation request message that may be advantageously used with the present invention.

FIG. 4 is a schematic block diagram of portions of a reservation request (e.g., RSVP Resv) message 400 that may be advantageously used with the present invention. Resv message 400 contains a common header 410, a policy data object 420, a reservation confirmation object 440 and a flow specification (flowspec) object 450. It should be noted that other objects defined by, e.g., the RSVP, may be included in the reservation request message, such as a session object which may contain address information of the receiver and a filter spec object which may contain address information of the sender.

A policy data object that may be used with the present invention is described in above-referenced RFC 2750. The policy data object 420 contains a preemption policy element 430 configured to hold values that define, inter alia, a preemption priority of the reservation associated with the reservation request message. The preemption priority represents a relative importance of the reservation with respect to a set of admitted (existing) reservations in the network. A preemption policy element that may be used with the present invention is defined in S. Herzog, "Signaled Preemption Priority Policy Element," RFC 3181. Preemption policy element 430 contains, inter alia, a preemption priority field 432 and a defending priority field 434. The preemption priority field 432 holds a value that identifies a priority of the new reservation and the defending priority field 434 holds a value that identifies a defending priority that is used to "defend" against being preempted by newer reservations after the reservation has been admitted.

The reservation confirmation object 440, when present, contains, inter alia, a value that identifies the object 440 as confirming the assignment of resources (e.g., identifying the object 440 as belonging to the RSVP RESV_CONFIRM class). The flowspec object 450 contains information that defines various traffic characteristics associated with the new reservation.

Figure 5:
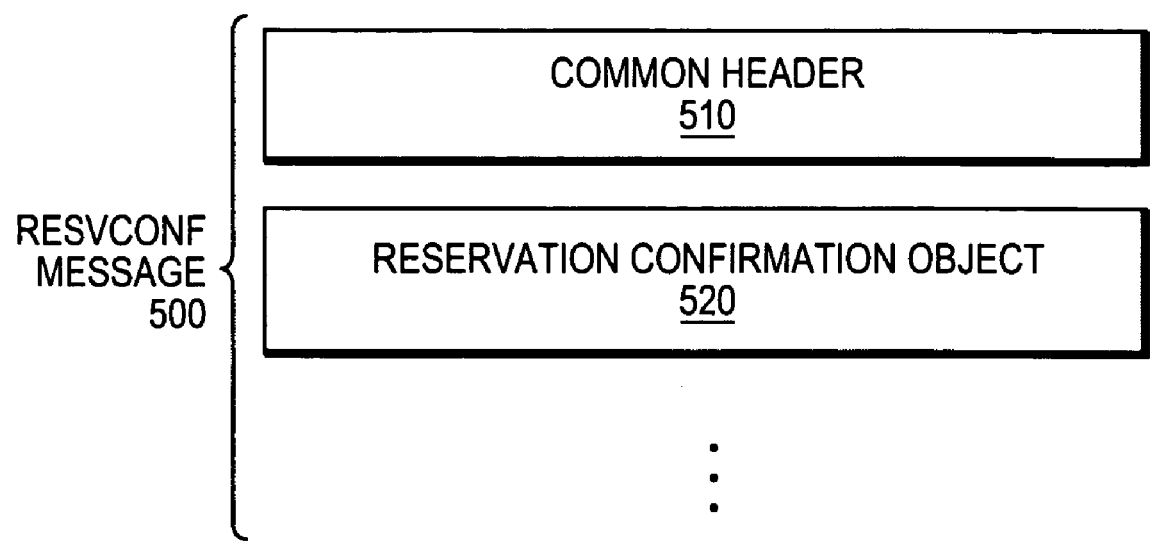
FIG. 5 is a schematic block diagram of a reserve confirmation message that may be advantageously used with the present invention.

In response to acquiring a Resv message comprising a reservation confirmation object 440, a sender generates and forwards a reserve confirmation (ResvConf) message to the receiver. The ResvConf message contains information that indicates to the receiver that the reservation has succeeded (i.e., the requested resources along the flow from the sender to the receiver have been reserved). FIG. 5 is a schematic block diagram of a reserve confirmation (ResvConf) message 500 that may be advantageously used with the present invention.

ResvConf message 500 comprises a header 510 and a reservation confirmation object 520. It should be noted that other objects and information, such as an RSVP error specification (ERROR_SPEC) object and a flow descriptor list, may be included in the reserve confirmation message 500. The reservation confirmation object 520 contains, inter alia, a value indicating that the object is, e.g., in the RSVP RESV_CONF class.

Figure 6:
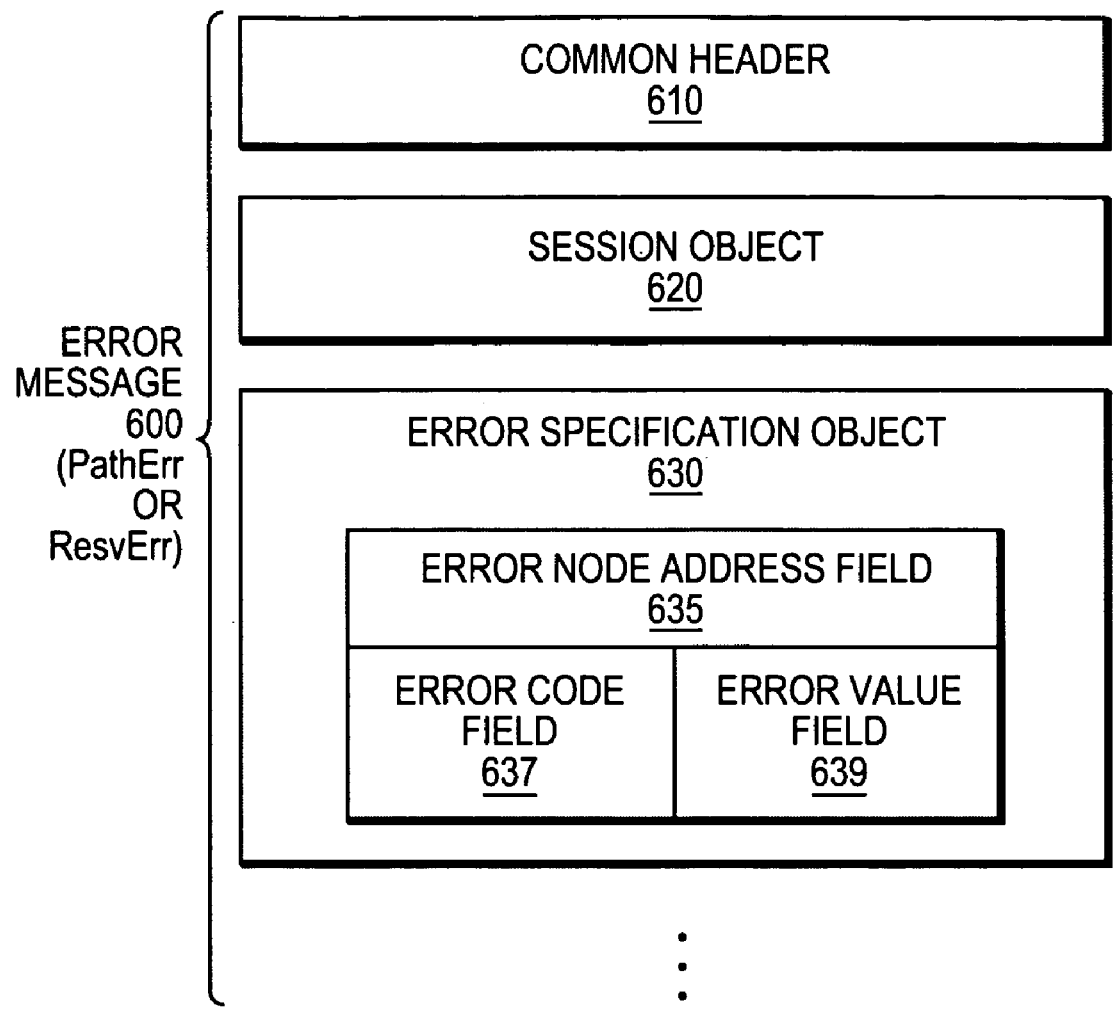
FIG. 6 is a schematic block diagram of an error message that may be advantageously used with the present invention.

If an intermediate node in the flow between the sender and receiver acquires a Path message 300 or Resv message 400 for a new reservation and cannot reserve sufficient resources for the new reservation, the intermediate node generates and forwards a path or reservation error (PathErr or ResvErr) message to the receiver, respectively. FIG. 6 is a schematic block diagram of an error message 600 that may be advantageously used with the present invention, e.g., as a PathErr or ResvErr message.

Error message 600 comprises in part a common header 610, a session object 620, is and an error specification object 630. The session object 620 identifies, inter alia, the destination address of the message (sender or receiver). The error specification object 630 contains, inter alia, an error node address field 635, an error code field 637, and an error value field 639. The error node address field 635 holds a value that represents an address (e.g., IP address) of a node in the flow that detected the error (e.g., insufficient resources). The error code field 637 holds a value that describes the error and the error value field 639 holds a value that represents additional information about the error.

Figure 7:
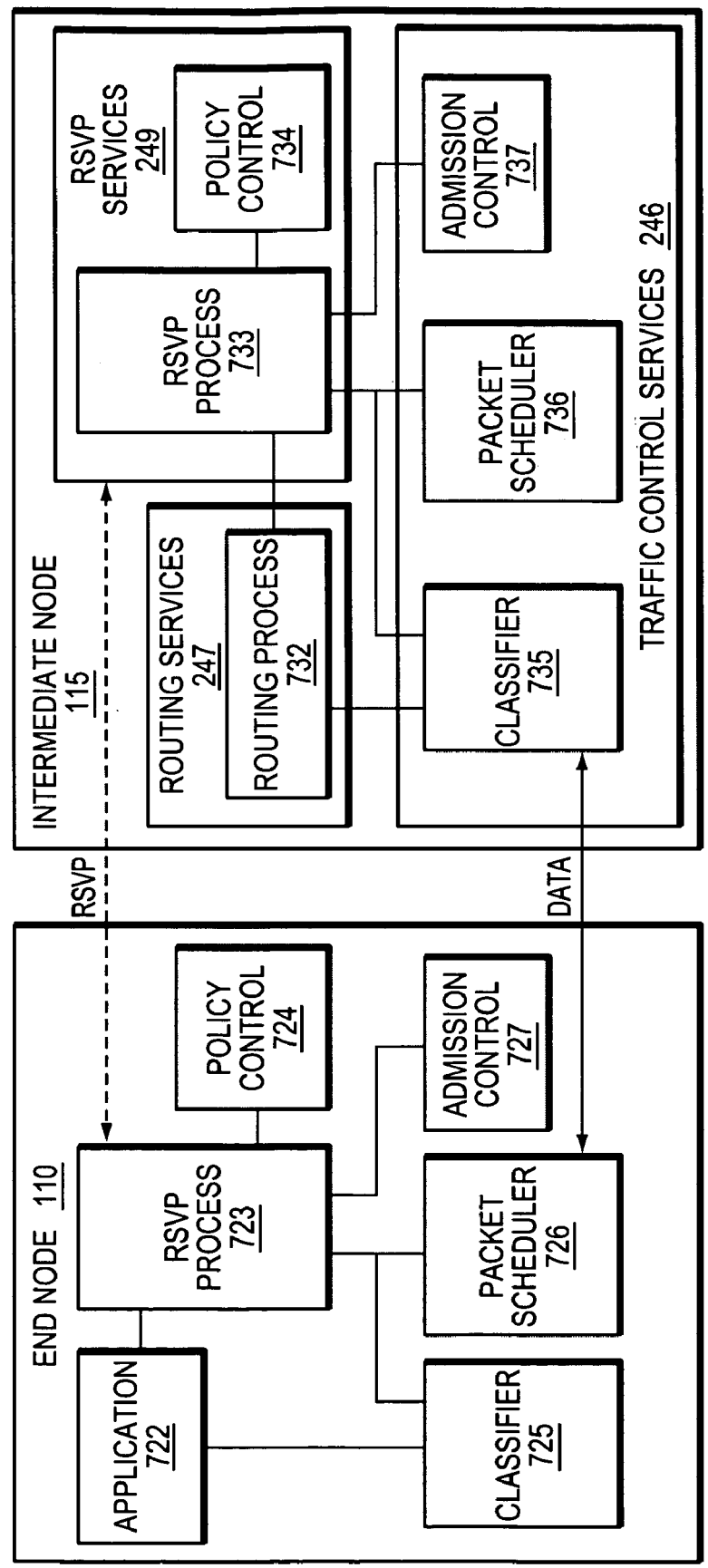
FIG. 7 is a schematic block diagram of various functional blocks associated with the Resource reSerVation Protocol.

FIG. 7 is a schematic block diagram of various functional blocks involved in processing e.g., RSVP messages, as well as implementing Quality of Service (QoS) for data flows in end node 110 and intermediate node 115. End node 110 comprises an application 722, which interfaces with an RSVP process 723 and a classifier 725. In addition, end node 110 comprises a packet scheduler 726, policy control 724 and admission control 727. The application 722 may issue various QoS requests for data flows associated with the application 722. The RSVP process 723 processes the requests, and generates and issues various RSVP messages (e.g., Path messages, Resv messages) in response to the requests. These messages may be used to communicate at the RSVP level with the RSVP process 733 in the intermediate node 115.

The QoS for a data flow on the end node 110 is implemented by functions collectively known as "traffic control." These functions include the classifier 725, packet scheduler 726 and admission control 727. The classifier 725 determines a QoS class for packets issued by the end node 110. The packet scheduler 726 determines when the issued packets are forwarded from the end node 110 to the intermediate node 115. The admission control function 727 determines whether the end node contains sufficient resources for allocation to a new reservation associated with a data flow.

Assume node 110 is a receiver on a flow between a sender and a receiver and that the application 722 has received a Path message from the sender. Further assume, in response to the Path message, the application 722 establishes a new reservation for a data flow between the sender and receiver by issuing a request that sets out the QoS requirements for the data flow to the RSVP process 723. The RSVP process 723 in conjunction with the policy control 724 and admission control 727 functions determine if the application has permission to establish the new reservation and, if so, whether sufficient resources exist on end node 110 to meet the requirements (QoS) of the new reservation. If both checks succeed, various parameters are set in the packet classifier 725 and packet scheduler 726 to reserve sufficient resources on end node 110 to obtain the requested QoS for the new reservation. Further, the RSVP process 723 may generate various RSVP messages (e.g., Resv message) that are forwarded to the sender via intermediate node 115.

The intermediate node 115 likewise contains an RSVP process 733, a policy control function 734, a classifier 735, a packet scheduler 736 and an admission control function 737. In addition, the intermediate node contains a routing process 732, which may be configured to implement various routing protocols, such as OSPF and IS-IS. The RSVP process 733 and policy control function 734 are illustratively contained in the intermediate node's RSVP services 249. The classifier 735, packet scheduler 736, and admission control 737 are illustratively contained in the intermediate node's traffic control services 246.

The RSVP process 733 processes RSVP messages (e.g., Resv messages) acquired by the intermediate node 115. This processing may include passing requests to the policy control function 734 and admission control function 737 to determine whether the nodes (e.g., end node 110) issuing the messages have permission to make reservations and determine if sufficient resources are available for the reservations. If both checks succeed, various parameters may be set in the intermediate node's packet classifier 735 and packet scheduler 736 to obtain the requested QoS. Further, the intermediate node 115 may forward the acquired RSVP messages to the next intermediate node in the flow associated with the various reservations. It should be noted that the functional blocks illustrated in FIG. 7 may be implemented in hardware, software or firmware or some combination thereof.

The present invention is directed to a technique for avoiding unnecessary preemption of resource reservations along a requested flow between nodes in a computer network. According to the technique, a node receives priority-based resource reservation requests and determines conditions of reservation eligibility by comparing the requested resources to the amount of available resources at the node. Specifically, the node maintains a novel "held resources" state where available requested resources are held prior to their being assigned or reserved (confirmed) for the requested flow, such as, e.g., during an initial Resource reSerVation Protocol (RSVP) Path message. The node includes the held resources in calculations of available resources in such a way as to prevent resources from being assigned or reserved if the resources would be subsequently preempted by a request of higher priority, or if an earlier request would first utilize the resources. The node (e.g., an end node) also prevents resources from being reserved or preempted in a duplex (bi-directional) reservation on a first flow in a first direction when resources available for a second flow in a second direction indicate a failure of the second flow.

FIG. 8A is a schematic block diagram of portions of an exemplary held resources (e.g., path_held_resources) table 800 that may be advantageously used with the present invention. The held resources table 800 contains a list of resources earmarked (held) for reservation requests that is yet to arrive, designated by fields including, inter alia, Request Identification (ID) field 805, Requested Resources field 810, and Priority field 815. Request ID field 805 contains one or more entries 820 that identify the particular request for which the resources are held. Each entry 820 is associated with a held resource in Requested Resources field 810, such as, e.g., 20 Megabits (M) of bandwidth. Also, each entry is associated with a priority value in Priority field 815, such as, e.g., priorities 1-5, where 5 is the highest.

FIG. 8B is a schematic block diagram of portions of an exemplary reserved resources table 850 that may be advantageously used with the present invention. The reserved resources table 850 contains a list of resources that is assigned (reserved) to requests that have already arrived, designated by fields including, inter alia, Reservation Identification (ID) field 855, Reserved Resources field 860, and Priority field 865. Reservation ID field 855 contains one or more entries 870 that identify the particular request for which the resources are reserved. Each entry 870 is associated with a reserved resource in Reserved Resources field 860 and a priority value in Priority field 865, as mentioned above. Those skilled in the art will understand that for simplicity, any references to defending priority level have been omitted from discussion here, and that it can be assumed that the priority level is the same for preemption and defending preemption throughout. Those skilled in the art will also understand that the tables 800 and 850 as shown are merely representative, and are not meant to be limiting to the scope of the present invention. Other possible table arrangements and/or mechanisms known in the art could also be used to store the held/reserved resources, such as lists, pointers, flags, etc., which are within the scope of the present invention.

As mentioned above, to establish a data flow between a sender (e.g., end node 110a) and a receiver (e.g., end node 110d), the sender may send a Path message 300 downstream to the receiver (e.g., via intermediate nodes 115), indicating resources, e.g., bandwidth, needed to accommodate the data flow, along with other attributes of the data flow, such as a priority of the request.

In accordance with one aspect of the present invention, when a node (e.g., intermediate node 115) receives a Path message 300 requesting a reserved flow, the node determines if there are available resources that meet the criteria of the requested flow. Available resources of the node include idle resources (unreserved/held) in combination with any lower priority reserved resources that may be preempted, less previously held resources at the node of equal or higher priority. In the event that insufficient resources exist at the node, the requested flow fails and the node may transmit an indication of the failure, such as an error message 600 (PathErr), to the nodes along the requested flow, or by continuing to forward the Path message 300 with an indication of the failure (e.g., in an Adspec object 350). Notably, a PathErr message clears any resources from being held for the request at upstream nodes, while sending the Path message 300 with an indication of failure on to the receiver allows the receiver to interpret the indication of failure and respond with a PathErr message itself.

Where there are available resources the node holds the resources for the requested flow, such as in the held resources table 800. The node then adjusts any currently held resources by removing the lowest priority held resource from being held until the idle resources, in addition to reserved resources with a priority lower than the lowest priority held resource, are greater than or equal to the total held resources.

Figure 9:
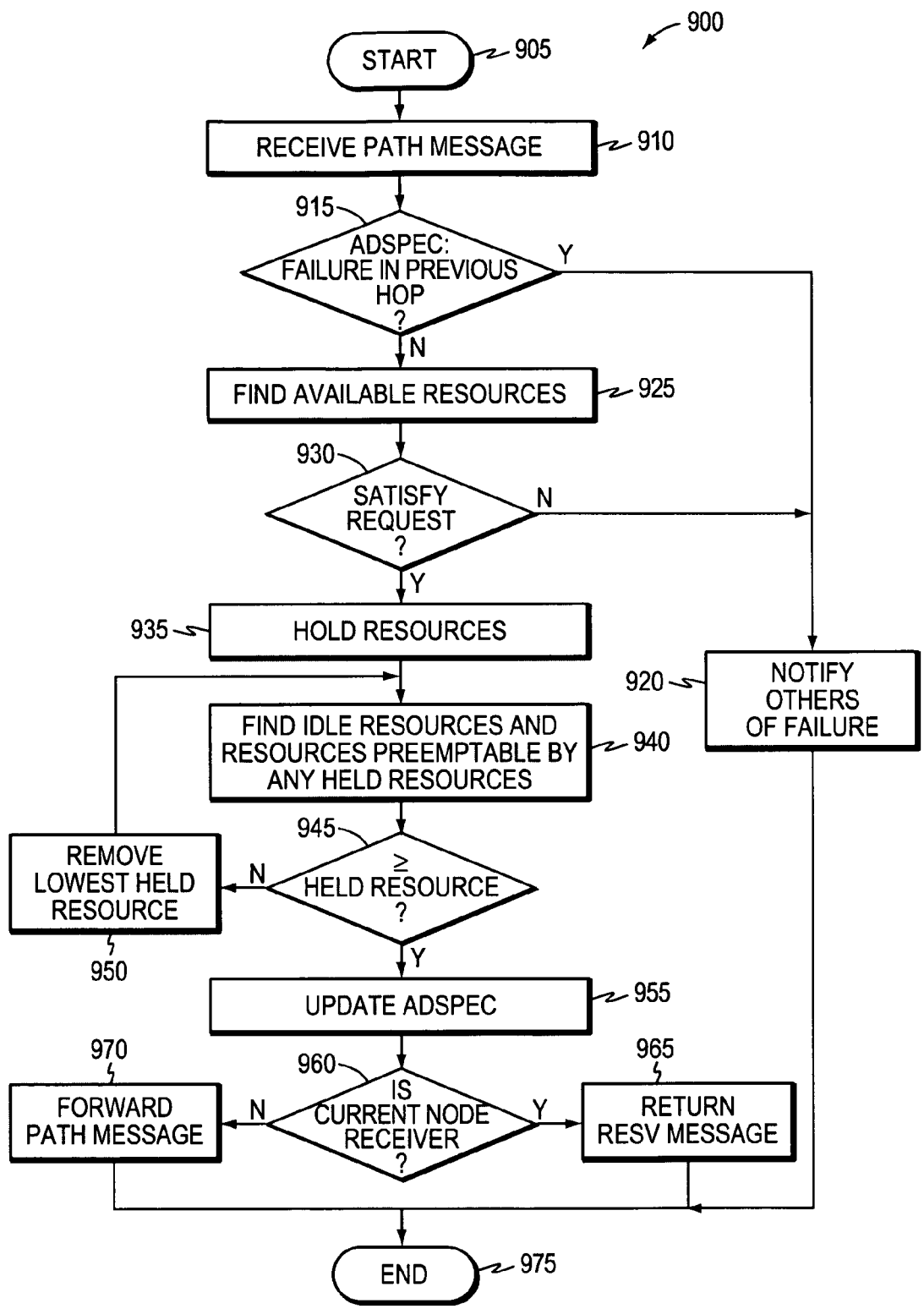
FIG. 9 is a flowchart illustrating a sequence of steps for managing a received path request message at a node in accordance with the present invention.

FIG. 9 is a flowchart illustrating a sequence of steps for managing a received path request (Path) message 300 at a node in accordance with the present invention. The sequence 900 starts at step 905 and continues to step 910, where the node receives the Path message 300 from either a sender (e.g., end node 110a) or an intermediate node (e.g., 115). Upon receiving the Path message 300, the node checks the Adspec object 350 of the message in step 915 and determines whether a previous hop indicates a failure of the flow, such as a lack of resources at a previous hop or other causes of failure known in the art. If there is a failure indicated at step 915, the node notifies other nodes of the failure in step 920. In particular, this may include returning a PathErr message 500 upstream to the previous hop nodes back to the sender, or forwarding the Path message 300 with an indication of the failure (in Adspec 350) to the receiver, as mentioned above. Once the notification (if any) is complete, the sequence ends at step 975.

If the Adspec 350 does not indicate failure in step 915, however, the sequence 900 continues to step 925, where the node finds available resources. Specifically, available resources include any idle resources, such as those that are currently unreserved, including previously held resources that are yet to be reserved (e.g., in held resources table 800), in combination with any currently reserved resources that have lower priority than the current Path message request (e.g., in Reserved Resources table 850), and thus may be preempted. Because certain previously held resources may have an equal or higher priority, these previously held resources must be accounted for when determining the actual amount of resources available; accordingly, these resources are subtracted from the above total resources. Notably, the amount of resources available may also be calculated as the idle resources in addition to the reserved resources and held resources of lower priority than the request, where the idle resources in this case refers to both unreserved and un-held resources, depending upon configuration at the node. For illustration as used herein, "idle" resources refers to any unreserved and any held resources.

Once the node accounts for the available resources, at step 930 the node determines whether the available resources satisfy the request. If not, the node may optionally send notification of the failure in step 920, as discussed above. If, on the other hand, the request may be satisfied, the node holds the resources in step 935, such as by adding the resources to held resources table 800. Now that new resources have been held, the node adjusts the held resources, if necessary, to ensure it has not over-utilized its available resources by exceeding what can be satisfied by preemptions or by removing lower priority held resources. In step 940, the node finds the amount of idle resources plus any reserved resources that have a lower priority (i.e., that are preemptable) than the lowest priority of a held resource. If this amount is not greater than or equal to the total amount of held resources in step 945, the node removes the lowest priority held resource in step 950, and repeats step 940. This cycle repeats until at step 945 the node determines that it has not over-utilized its resources. At this point, the sequence continues to step 955, where the node updates the Adspec object 350 of the Path message with the appropriate values. Namely, the Adspec object 350 is updated with values for the available resources that take into account the previously held resources of equal or higher priority than the current request. If at step 960 the node is the receiver, it may return a Resv message 400 in step 965, as described below. If the node is not the receiver, i.e., it is an intermediate node, then the node forwards the Path message 300 to the next node of the flow. The sequence ends at step 975.

When the receiver, e.g., node 110d, receives the Path message 300, it may also perform the above sequence 900 to hold resources for the requested flow (notably, because the receiver may be an intermediate node for other flows). Prior to performing the steps of the sequence, however, the receiver looks to the Adspec object 350 of the Path message 300 for an indication as to whether a Resv message 400 in response will fail. Particularly, the receiver establishes if any node along the flow has indicated that it will fail to reserve the requested resources. In addition to where a node does not have enough resources, this indication now includes where a node is expecting (i.e., is previously holding resources for) an equal or higher priority reservation that may arrive before or shortly after reserving resources for the current request. To prevent unnecessary preemptions, if the receiver receives an indication of failure, it does not send a Resv message 400 in response to the Path message. If there is no indication of failure, however, the receiver may return a Resv message 400 in step 965 as mentioned above. Notably, a receiver that returns a Resv message 400 in response to a Path message 300 with an Adspec object 350 indicating failure is referred to herein as a "rogue" receiver.

In accordance with another aspect of the present invention, when a node, e.g., intermediate node 115, receives a Resv message 400 requesting that resources be assigned for a reserved flow, the node establishes whether the resources contained in the Resv message 400 correspond to any previously held resources, such as by referring to the held resources table 800. If resources are currently being held by the node for this particular request, the node assigns (reserves) the resources to the requested flow. If not, however, the node again determines if there are available resources that meet the criteria of the requested flow. This determination accommodates rogue receivers sending Resv messages 400 after receiving an indication of failure, or in the case where resources held for the requests were removed by subsequent requests of a higher priority, both mentioned above. In the event that insufficient resources exist, the requested flow fails and the node may transmit an indication of the failure, such as an error message 600 (ResvErr), to the nodes along the requested flow. Where there are available resources, the node assigns the resources to the requested flow, and again adjusts any currently held resources, as described above. Notably, no preemptions are performed until the node receives a ResvConf message 500, confirming the reservation of the requested flow.

Figure 10:
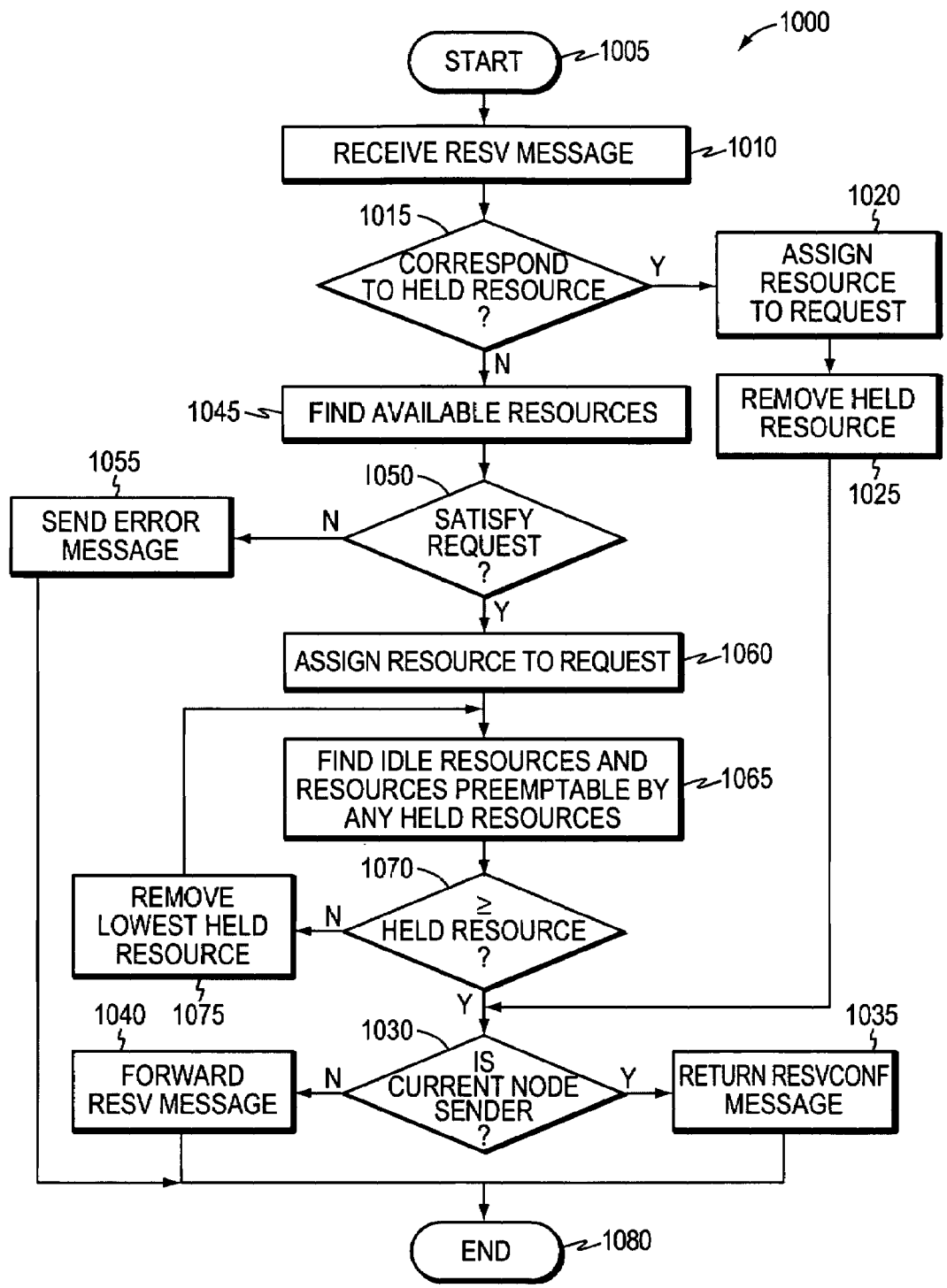
FIG. 10 is a flowchart illustrating a sequence of steps for managing a received reservation request message at a node in accordance with the present invention.

FIG. 10 is a flowchart illustrating a sequence of steps for managing a received reservation request (Resv) message 400 at a node in accordance with the present invention. The sequence 1000 starts at step 1005, and continues to step 1010, where the node receives the Resv message 400 from either a receiver (e.g., end node 110d) or an intermediate node (e.g., 115). Upon receiving the Resv message 400, the node compares the request to previously held resources for received Path messages 300 to determine whether the request corresponds to any of those held resources in step 1015. If the request corresponds to held resources, the node assigns (reserves) the resources to the request in step 1020 (e.g., adds an appropriate entry in reserved resources table 850), and removes the resources from the held resources table 800 in step 1025. If at step 1030 the node is the sender, it may return a ResvConf message 500 in step 1035, as described below. If the node is not the sender, i.e., it is an intermediate node, then the node forwards the Resv message 400 to the next node of the flow. The sequence ends at step 1080.

If the request in the Resv message 400 does not correspond to any held resources in step 1015, however, such as where a rogue receiver has sent a Resv message 400 with an indication of failure, or perhaps where the held resources for this request have been removed due to a subsequent request of higher priority (described above), the sequence 1000 continues to step 1045, where the node finds available resources as described above with reference to receiving the Path message 300 in FIG. 9. Once the node accounts for the available resources, at step 1050 the node determines whether the available resources satisfy the request. If not, the node sends notification of the reservation failure in step 1055, such as through a ResvErr message 600 described above, and the sequence ends at step 1080.

If, on the other hand, the request may be satisfied, the node assigns (reserves) the resources in step 1060 (e.g., adds an appropriate entry in reserved resources table 850). Now that the resources have been reserved, the node adjusts the held resources, if necessary, to ensure that it has not over-utilized its available resources by exceeding what can be satisfied by preemptions or by removing lower priority held resources. In step 1065, the node finds the amount of idle resources plus any reserved resources that have a lower priority (i.e., that are preemptable) than the lowest priority of a held resource. If this amount is not greater than or equal to the total amount of held resources in step 1070, the node removes the lowest priority held resource in step 1075, and repeats step 1065. This cycle repeats until at step 1070 the node determines that it has not over-utilized its resources. This is similar to the how the node manages the held resources in response to a Path message 300 as described above in FIG. 9. Once the cycle completes, if necessary, the sequence continues to step 1030, where again if the node is the sender, it may return a ResvConf message 500 in step 1035, as described below. If the node is not the sender, i.e., it is an intermediate node, then the node forwards the Resv message 400 to the next node of the flow. The sequence ends at step 1080.

When the sender, e.g., node 110a, receives the Resv message 400, it may also perform the above sequence 1000 to reserve resources for the requested flow. Prior to performing the steps of the sequence, however, the sender looks to the Reservation Confirmation Object 440 of the Resv message 400 for an indication as to whether all nodes along the flow have established successful reservations for the requested resources. If the Reservation Confirmation Object 440 indicates success, the sender may send a ResvConf message 500 back along the flow to confirm the establishment of the flow and cause any necessary preemptions to take place, thereby completing the process of establishing a flow. As mentioned above, the ResvConf message 500 is described in further detail in the above-incorporated U.S. patent application Ser. No. 10/875,985, entitled METHOD FOR IMPROVING RSVP-BASED PREEMPTION.

As a brief example of the benefits obtained by the present invention, FIG. 11 is a schematic diagram of representative signaling exchanges to reserve resources for one or more flows at a node. The signaling exchanges on the left are signals and results produced without the held resources of the present invention, while the signaling exchanges on the right are for those with the held resources as described herein. The first series of signaling exchanges represents a single path request for a flow "1." With or without held resources, assuming resources are available, a Path message 300 ("Path 1") is sent in one direction, a Resv message 400 ("Resv 1") is returned in the other direction to assign the resources, and a ResvConf message 500 ("ResvConf 1") confirms the reservations. With held resources, however, once Path 1 is received, the node would hold the requested resources The second series of signaling exchanges demonstrate a benefit of the present invention. Assume that the first flow "1" is a lower priority than a second flow "2." Also assume that the node only has enough available resources for one or the other of the two flows, but not both at once. Without held resources, the node receives Path 1, and has available resources. The node then receives Path 2, and still has available resources, because they are not yet reserved by "1." When Resv 1 is returned in response to Path 1, the node assigns the resources to "1." However, when Resv 2 is returned in response to Path 2 with higher priority, the node assigns the resources to "2" and marks the resources reserved for "1" for preemption. ResvConf 1 is then returned to confirm the reservations of "1" to establish the first reserved flow, and then shortly thereafter ResvConf 2 is returned, which causes the preemption of "1," and the disruption of the first reserved flow. With held resources, however, this unnecessary preemption is avoided due to the expectation of preemption. For instance, when Path 1 is received, the resources are held for "1." Now when Path 2 is received with a higher priority, resources are held for "2" and the previously held resources for "1" are removed. When Resv 1 is returned, the request no longer corresponds to any held resources, (and in this example, no other resources are available), so no resources are assigned to "1." Because "1" failed before it was established, it may attempt to establish the flow elsewhere without having been established and disrupted. Now when Resv 2 is returned, held resources correspond to the request, and are assigned, such that when ResvConf 2 is received, the reservation for "2" is complete without having to preempt "1."

In another brief example, the third series of signaling exchanges demonstrate another benefit of the present invention. Assume here that the first flow "1 " is now a higher priority than a second flow "2." Again assume that the node only has enough available resources for one or the other of the two flows, but not both at once. Without held resources, the node receives Path 1, and has available resources. The node then receives Path 2, and still has available resources, because they are not yet reserved by "1." When Resv 1 is returned in response to Path 1, the node assigns the resources to "1." However, when Resv 2 is returned in response to Path 2 with lower priority, the node is unable to assign the resources to "2" since "1" is a higher priority, and "2" fails. ResvConf 1 is then returned to confirm the reservations of "1" to establish the first reserved flow. With held resources, however, unnecessary signaling is avoided due to the expectation of preemption. For instance, when Path 1 is received, the resources are held for "1." Now when Path 2 is received with a lower priority, resources are not held for "2" because of the previously held resources for "1" with a higher priority. Because "2" failed during the Path message stage, extra signaling produced by a Resv 2 message is avoided in expectation of the previously held resources of a higher priority. When Resv 1 is returned, the request corresponds to held resources, and the resources are assigned to "1," and ResvConf 1 completes flow "1."

In accordance with still another aspect of the present invention, when operating to create a duplex reservation between two end nodes (e.g., a voice call), a first end node (e.g., 110a) confirms reservations for a first flow in a first direction (e.g., to a second end node 110d) dependent upon receiving an indication that a second flow in a second direction is likely to be successful. In particular, the first end node determines whether it has received a second Path message 300 for the second flow from a second end node. If the second Path message 300 indicates that enough resources may be reserved for the second flow (e.g., in an Adspec 350), the first end node then confirms the reservation of the first flow (e.g., with a ResvConf message 500) in response to receiving from the second end node a first Resv message 400 for the first flow. Otherwise, if the second flow is not likely to succeed (e.g., no receipt of second Path message 300 or other indication of failure in the second Path message 300), the first end node denies confirmation of the first flow anticipating the failure of duplex reservation. In this way, any unnecessary preemptions required by the confirmation of the first flow are avoided in the event the second flow of the duplex will fail nonetheless.

Figure 12:
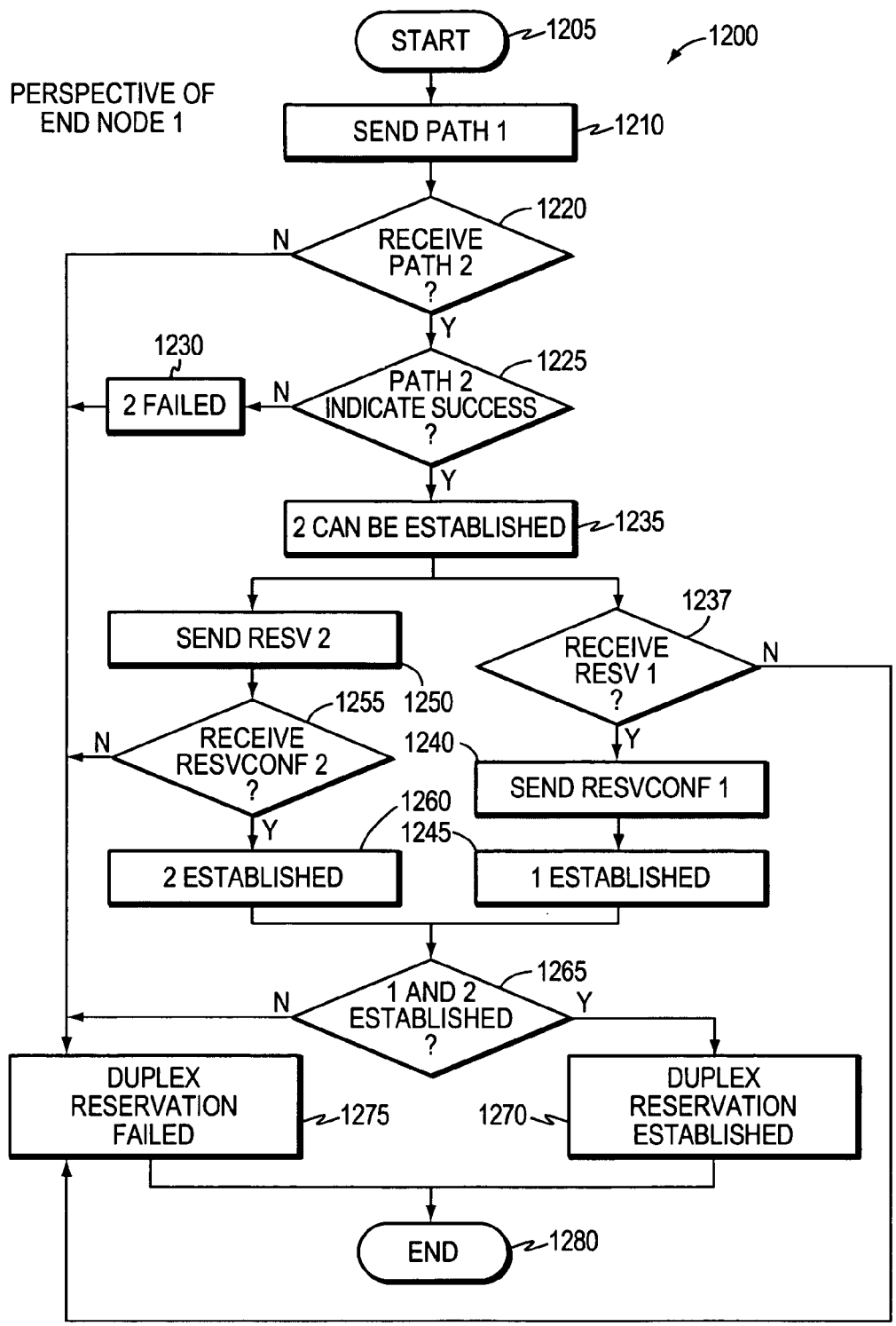
FIG. 12 is a flowchart illustrating a sequence of steps for managing an establishment of a duplex reservation in accordance with the present invention.

FIG. 12 is a flowchart illustrating a sequence of steps for managing an establishment of a duplex reservation at either sender of the duplex in accordance with the present invention. The sequence 1200 starts at step 1205, and continues to step 1210, where the sender sends a Path message 300 for a first flow in a first direction ("Path 1"). At step 1220, the sender determines whether is has received a Path message 300 for a second flow in a second direction ("Path 2"). Notably, in a duplex reservation, the sender of Path 1 is the receiver of Path 2. For illustration, the sender is referred to as such herein regardless. If the sender does not receive Path 2, the duplex fails at step 1275. Upon receiving Path 2 at step 1220, however, the sender determines whether Path 2 indicates success of reservations for Path 2 in step 1225, such as by examining the Adspec object 350 of the Path message 300, as described in detail above. If Path 2 indicates failure in step 1225, the sender declares that the second requested flow "2" has failed in step 1230, and as such the duplex fails in step 1275.

If at step 1225 Path 2 indicates success, the sender determines that the second requested flow "2" can be established in step 1235, and continues the sequence for establishing "2" and the first flow "1" in parallel, both dependent upon the indicated success of "2." Again, because the establishment of the first flow "1" is dependent upon the likelihood of success of the second flow "2," no preemptions are performed in response to the first flow unless the duplex is likely to be established. To continue to establish "1," if at step 1237 the sender receives a Resv message 400 for the first flow ("Resv 1"), the sender sends a ResvConf message 500 for the first flow ("ResvConf 1") back along the flow, and hence "1" is established in step 1245. If at step 1237 a Resv 1 was not received, the duplex reservation fails in step 1275, and the sequence ends at step 1280.

To continue to establish "2," the sender responds to Path 2 with a Resv message 400 for the second flow ("Resv 2") in step 1250. If the sender does not receive a ResvConf message 500 for the second flow ("ResvConf 2") at step 1255, the duplex has failed in step 1275. Otherwise, once the sender receives ResvConf 2 at step 1255, "2" is established in step 1260. Upon establishment of both flows "1" and "2" at step 1265, the duplex reservation is complete in step 1270, and the sequence ends at step 1280. If, for some reason, either of "1" or "2" is not established at step 1265, the duplex fails at step 1275.

Advantageously, the novel technique avoids unnecessary preemption of resource reservations along a requested flow between nodes in a computer network. By holding priority-based requested resources and using the held resources in calculating the available resources of the node prior to assigning and/or reserving the resources, the inventive technique prevents resources from being unnecessarily assigned or reserved, and hence prevents unnecessary preemptions that would occur from such assignments or reservations. Also, by preventing resources from being reserved in a duplex reservation on a first flow when a second flow indicates failure, unnecessary preemptions that could occur from reserving the first flow are avoided.

While there has been shown and described an illustrative embodiment that avoids unnecessary preemption of resource reservations along a requested flow between nodes in a computer network, it is to be understood that various other adaptations and modifications may be made within the spirit and scope of the present invention. For example, while the above description uses RSVP signaling messages and the Adspec object to exchange reservation request/response information, the invention may also be advantageously used with other request/response signaling exchanges, or other messages exchanged between the nodes that are known to those skilled in the art that could be readily adapted to accommodate an exchange of reservation request/response information as described herein.

Notably, some parts of the invention have been illustratively shown and described herein using numbers to designate priority for reservations such that the lower the number the lower the priority of the reservation. This is not intended to be a limitation of the invention. Other techniques may be used to indicate priority of reservations. For example, a technique that employs a scheme where numbers that are lower in value are considered higher in priority than numbers that are higher in value may take advantage of the inventive technique. Also, a bit-wise mask may be used to indicate priority.

Furthermore, the invention has also been illustratively shown and described herein using duplex (bi-directional) arrangements. However, the present invention is equally applicable to any "application instances," broadly defined as a set of one or more related data flows. More specifically, the data flows in the application instance are related such that loss or corruption of any one of the flows affects the utility of the other flows. It should also be noted that application data flows need not be symmetrical, as described above in terms of a conventional duplex telephone call. For example, an application instance may have one or two data sources and many receivers, the route from node A to node B may materially differ from the route from node B to node A, or network nodes participating in the same application instance may use different software applications, such as having only a few nodes send video data flows but all send audio, shared whiteboard data or text.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for avoiding unnecessary preemption of resource reservations along a requested flow between nodes in a computer network, the method comprising:

maintaining a held resources state at a node, the held resources state indicating that resources of the node are held for path request messages prior to their being reserved by resource reservation requests;

receiving at the node a first path request message for a first flow in a first direction indicating requested resources;

calculating the amount of available resources at the node, the calculation including resources that are held at the node;

comparing the requested resources to the amount of available resources at the node;

determining that conditions of reservation eligibility are met when the requested resources are less than or equal to the amount of available resources;

receiving a first resource reservation request for the first flow at a sender of the first flow;

receiving a second path request message at the sender of the first flow, the second path request message for a second flow in a second direction, the second path request message having an indication of a likelihood of success of the second flow based upon a determination of whether conditions of reservation eligibility are met for the second flow; and returning, from the sender of the first flow, a first reservation confirmation message for the first flow after receiving both the first resource reservation request and the second path request message, where the second path request message indicates success for the second flow.

2. The method as in claim 1, further comprising: if conditions of reservation eligibility are met, holding resources for a path request message in the held resources state.

3. The method as in claim 1, further comprising: forwarding the first path request message to a next node along the first flow, the first path request message having an indication of a likelihood of success of the first flow based upon the determination as to whether conditions of reservation eligibility are met.

4. The method as in claim 3, further comprising:

receiving the first path request message at a receiver of the first flow; and returning a resource reservation request message along the flow in the event the first path request message indicates success.

5. The method as in claim 3, wherein the indication of a likelihood of success of a flow is stored in an Adspec object of the forwarded path request message.

6. The method as in claim 1, further comprising:

receiving at the node a resource reservation request message indicating requested resources along a flow; and if the requested resources of the resource reservation request correspond to held resources for a path request message, reserving the requested resources for the flow.

7. The method as in claim 6, further comprising:

if the requested resources of the resource reservation request do not correspond to held resources for a path request message, i) calculating the amount of available resources at the node, the calculation including resources that are held at the node, ii) comparing the requested resources to the amount of available resources at the node, and iii) determining that conditions of reservation eligibility are met when the requested resources are less than or equal to the amount of available resources.

8. The method as in claim 7, further comprising: if conditions of reservation eligibility are met for the resource reservation request, reserving the requested resources for the flow.

9. The method as in claim 1, wherein requested resources, held resources, and reserved resources are associated with a priority level, the method further comprising: calculating the amount of available resources at the node as the amount of unreserved resources plus reserved resources of a lower priority than a priority of the requested resources, less held resources of an equal or greater priority than the priority of the requested resources.

10. The method as in claim 9, further comprising: removing a selected held resource of a lower priority than the priority of the requested resources in the event the available resources at the node is less than the amount of requested resources.

11. A system comprising:
- a table to maintain a held resources state at a node, the held resources state indicating that resources of each node are held for path request messages prior to their being reserved for resource reservation requests:
- a processor configured to i) calculate the amount of available resources at the node, the calculation including resources that are held at the node, ii) compare the requested resources to the amount of available resources at the node, and iii) determine, that conditions of reservation eligibility are met when the requested resources are less than or equal to the amount of available resources:
- a network interface at a sender of the first flow to receive a first resource reservation request for the first flow, and to receive a second path request message, the second path request message for a second flow in a second direction, the second path request message having an indication of a likelihood of success of the second flow based upon a determination of whether conditions of reservation eligibility are met for the second flow; and
- a network interface to return, from the sender of the first flow, a first reservation confirmation message for the first flow after receiving both the first resource reservation request and the second path request message, where the second path request message indicates success for the second flow.

12. The system as in claim 11, further comprising: if conditions of reservation eligibility are met, the table further to hold resources for a path request message in the held resources state.

13. The system as in claim 11, further comprising:
- a network interface to receive at the node a resource reservation request message indicating requested resources along a flow; and
- if the requested resources of the resource reservation request correspond to held resources for a path request message, a reserved resources table to reserve the requested resources for the flow.

14. The system as in claim 11, wherein requested resources, held resources, and reserved resources are associated with a priority level, the system further comprising: the processor further configured to iv) calculate the amount of available resources at the node as the amount of unreserved resources plus reserved resources of a lower priority than a priority of the requested resources, less held resources of an equal or greater priority than the priority of the requested resources.

15. An apparatus, comprising:
- means for maintaining a held resources state at a node, the held resources state indicating that resources of the node are held for path request messages prior to their being reserved for resource reservation requests;
- means for receiving at the node a first request message for a first flow in a first direction indicating requested resources;
- means for calculating the amount of available resources at the node, the calculation including resources that are held at the node;
- means for comparing the requested resources to the amount of available resources at the node; and means for determining, prior to receiving a resource reservation request at the node from an end node, that conditions of reservation eligibility are met when the requested resources are less than or equal to the amount of available resources;
- means for receiving the first resource reservation request for the first flow at a sender of the first flow;
- means for receiving a second path request message at the sender of the first flow, the second path request message for a second flow in a second direction, the second path request message having an indication of a likelihood of success of the second flow based upon a determination of whether conditions of reservation eligibility are met for the second flow; and
- means for returning, from the sender of the first flow, a first reservation confirmation message for the first flow after receiving both the first resource reservation request and the second path request message, where the second path request message indicates success for the second flow.

16. The apparatus as in claim 15, further comprising: if conditions of reservation eligibility are met, means for holding resources for a path request message in the held resources state.

17. The apparatus as in claim 15, further comprising:
- means for receiving at the node a resource reservation request message indicating requested resources along a flow; and
- if the requested resources of the resource reservation request correspond to held resources for a path request message, means for reserving the requested resources for the flow.

18. The apparatus as in claim 15, wherein requested resources, held resources, and reserved resources are associated with a priority level, the apparatus further comprising: means for calculating the amount of available resources at the node as the amount of unreserved resources plus reserved resources of a lower priority than a priority of the requested resources, less held resources of an equal or greater priority than the priority of the requested resources.

19. A method for avoiding unnecessary preemption of resource reservations along a requested flow between nodes in a computer network, the method comprising:
- sending a first path request message for a first flow in a first direction;
- receiving a first resource reservation request for the first flow;
- receiving a second path request message for a second flow in a second direction, the second path request message having an indication of a likelihood of success of the second flow; and
- returning a first reservation confirmation message for the first flow in response to receiving both the first resource reservation request and the second path request message, if the second path request message indicates likely success for the second flow.

20. The method as in claim 19, further comprising:
- denying a confirmation for the first flow in response to receiving both the first resource reservation request and the second path request message, if the second path request message indicates the second flow is not likely to succeed.

21. The method as in claim 19, further comprising:
- preventing the first flow from preempting one or more other data flows, if the second path request message indicates the second flow is not likely to succeed.

22. The method as in claim 19, wherein the first path request message and the second path request message are Resource reSerVation Protocol (RSVP) Path messages and the first resource reservation request is a RSVP Resv message.

23. An apparatus comprising:

one or more network interfaces operable to send a first path request message for a first flow in a first direction, receive a first resource reservation request for the first flow, and receive a second path request message for a second flow in a second direction, the second path request message having an indication of a likelihood of success of the second flow; and a processor operable to generate a first reservation confirmation message for the first flow in response to receipt of both the first resource reservation request and the second path request message, only if the second path request message indicates likely success for the second flow.

24. The apparatus as in claim 19, wherein the processor is further operable to deny a confirmation for the first flow, if the second path request message indicates the second flow is not likely to succeed.

25. The apparatus as in claim 19, wherein the processor is further configured to prevent the first flow from preempting one or more other data flows, if the second path request message indicates the second flow is not likely to succeed.

26. The apparatus as in claim 19, wherein the first path request message and the second path request message are Resource reSerVation Protocol (RSVP) Path messages and the first resource reservation request is a RSVP Resv message.

* * * * *

UNITED STATES PATENT AND TRADEMARK OFFICE
CERTIFICATE OF CORRECTION

PATENT NO. : 7,636,302 B2  Page 1 of 1
APPLICATION NO. : 11/134668
DATED : December 22, 2009
INVENTOR(S) : Tyagi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1200 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,636,302 B2
APPLICATION NO. : 11/134668
DATED : December 22, 2009
INVENTOR(S) : Satyam Tyagi It is certified that error appears in the above-identified patent and that said Letters Patent is hereby corrected as shown below:

Col. 9, Line 22, please amend as shown:

610, a session object 620,[[ is]] and an error specification object

Col. 19, Line 5, please amend as shown:

reserved for the resource reservation requests[[:]];

Col. 19, Line 13, please amend as shown:

resources[[:]];

Signed and Sealed this
Twelfth Day of July, 2011

David J. Kappos
*Director of the United States Patent and Trademark Office*